United States Patent [19]

Turner

[11] Patent Number: 4,852,231

[45] Date of Patent: Aug. 1, 1989

[54] PISTON WRIST PIN INSTALLATION AND REMOVAL DEVICE AND METHOD OF USING

[76] Inventor: James E. Turner, 407 Sunset, Nashville, Ark. 71852

[21] Appl. No.: 47,299

[22] Filed: May 5, 1987

[51] Int. Cl.[4] .................... B23Q 1/00

[52] U.S. Cl. .................... 29/156.5 A; 29/426.5; 29/234; 29/255; 29/272; 29/275; 29/283; 29/525.1

[58] Field of Search .................... 29/156.5 A, 156.5 R, 29/426.1, 426.5, 234, 249, 255, 272, 275, 283, 520.1; 173/90; 74/595

[56] References Cited

U.S. PATENT DOCUMENTS 4,050,139 9/1977 Okamuro .................... 29/283
4,118,851 10/1978 DeMartelaere .................... 29/283
4,118,852 10/1978 Schneider .................... 29/251 X
4,339,865 7/1982 Shultz .................... 29/275 X

*Primary Examiner*—Timothy V. Eley
*Attorney, Agent, or Firm*—Berman, Aisenberg & Platt

[57] ABSTRACT

A device for installation and removal of a wrist pin from a piston includes a press pin having an upper end for engaging a hydraulic ram and a lower end section of reduced diameter which engages into the bore of the upper end of a wrist pin. The lower end of the wrist pin is engaged by an end section of reduced diameter of a guide pin, the end section of reduced diameter having at least one groove encircling its circumference and having an O-ring engaged in the groove. The press pin, wrist pin and guide pin engage together to form a substantially rectilinear rod-like structure, enabling the wrist pin to be inserted through the shaft of the piston and eye of the connecting rod without damage to the shaft.

11 Claims, 4 Drawing Sheets

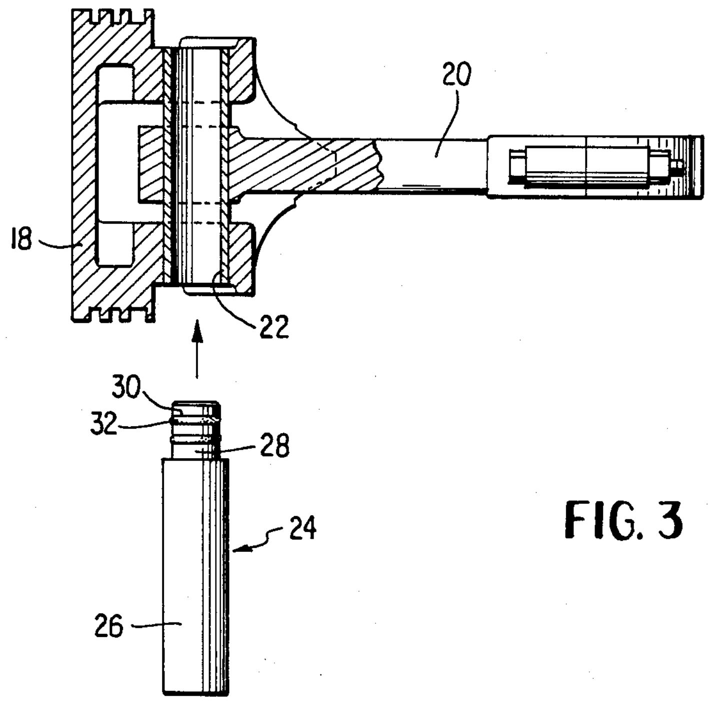
FIG. 3
FIG. 4
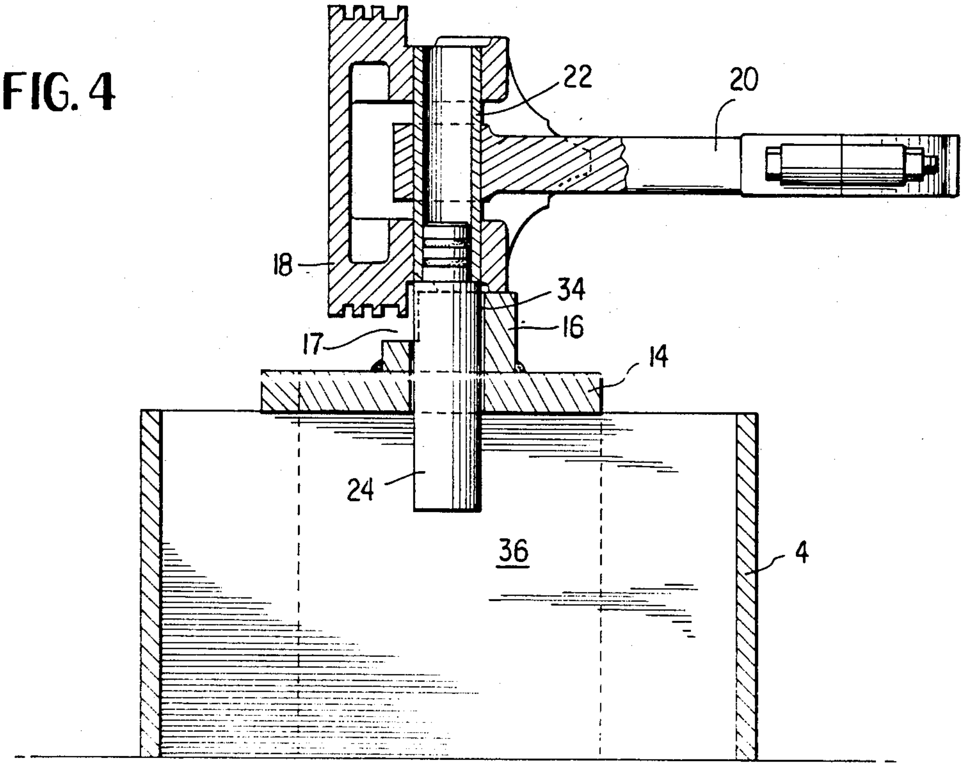

PISTON WRIST PIN INSTALLATION AND REMOVAL DEVICE AND METHOD OF USING

FIELD OF THE INVENTION

The invention relates to a device for facilitating removal and installation of piston wrist pins.

BACKGROUND OF THE INVENTION

Piston wrist pins are traditionally made from hollow hardened steel members, and a wrist pin is closely fitted into a piston made of softer metal, such as an aluminum alloy. It is necessary to force the wrist pin into the bore of the connecting rod and, during this operation, the piston is conventionally subjected to strong clamping pressure in order to force the wrist pin in or out of the eye of the connecting rod. Prior practice resulted in distortion or damage to the connecting rod eye, through which the wrist pin is forced, or to the piston.

Known patents, such as Fuglie et al., U.S. Pat. No. 2,891,302, and Schneider, U.S. Pat. No. 4,118,852, show devices having a press pin with an end section of reduced diameter which enters into the bore of the upper end of a wrist pin. Neither of these two patents, nor other patents directed to this subject matter, for example, De Martelaere, U.S. Pat. No. 4,118,851, Sunnen, U.S. Pat. No. 2,887,768, Stein, U.S. Pat. No. 3,031,744, Simmons, U.S. Pat. No. 3,111,752, Okamuro, U.S. Pat. Nos. 4,050,139 and 4,073,051, show a guide pin having an end section of reduced diameter, which enters into the lower end of a bore of a wrist pin to guide the wrist pin linearly through the connecting rod eye.

SUMMARY OF THE INVENTION

The piston wrist pin installation and removal device of the invention comprises a press pin having a first end which engages with a hydraulic ram and a second end having an end section of reduced diameter which engages into the bore of the upper end of the wrist pin. A guide pin has an end section of reduced diameter which enters the bore of the wrist pin at the lower end of the wrist pin, the section of reduced diameter having at least one groove encircling the perimeter of the section of reduced diameter, each groove containing an O-ring to provide a close fit of the guide pin in the bore of the wrist pin. The press pin and guide pin, each having an end section of reduced cross-section, each engage in the bore at opposite ends of the wrist pin, and together provide horizontal and vertical stability to the wrist pin while inserting the wrist pin into, or removing it from, the piston assembly. This rod-like, rectilinear structure prevents damage to the bore of the hollow piston and the connecting rod eye, since the guide pin is inserted into the piston/conecting rod assembly before inserting the wrist pin, thus guiding the wrist pin straight through the bore of the piston/connecting rod assembly.

An object of the invention is to provide an improved guide pin for providing horizontal and vertical stability to a wrist pin during insertion into and removal from a piston/connecting rod assembly.

A further object of the invention is to provide a guide pin having an end section of reduced diameter for receiving O-ring means in at least one groove encircling said end section of reduced diameter.

BRIEF DESCRIPTION OF THE DRAWINGS

FIG. 3 is a side view, partly in cross-section, showing insertion of a guide pin into the bore of a wrist pin.

FIG. 4 is a side view, partly in cross-section, showing a guide pin inserted into a wrist pin.

DETAILED DESCRIPTION OF THE INVENTION

In the arrangement of the invention, a guide pin, which is inserted into the bore of a wrist pin at its lower end provides horizontal and vertical stability to the wrist pin while inserting the wrist pin into, or removing it from, a piston/connecting rod assembly. The wrist pin has a press fit in the eye of the connecting rod, and a running fit in the piston bore. Without such horizontal and vertical stability, the wrist pin, which is of substantially harder material than the material of the piston and connecting rod, may damage the inner surface of the bores of the piston and connecting rod. In a typical system, a wrist pin is pressed into the connecting rod eye at a pressure of, for example, 300 lb./sq. in.

Figure 1:
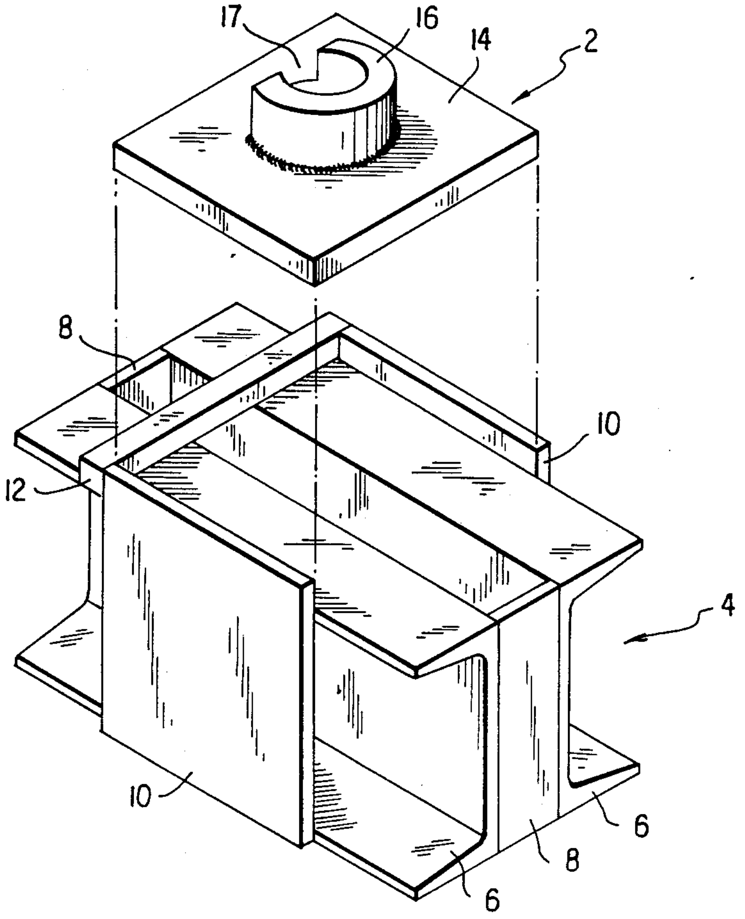
FIG. 1 is an exploded perspective view of an anvil and press plate useful in practicing the invention.

With reference to FIGS. 1 to 6, in which like numerals represent like parts, FIG. 1 shows an exploded view of press plate 2 positioned ready for placement on anvil 4 of the invention. The anvil rests on a supporting base of a conventional press equipped with a hydraulic ram. Anvil 4 may, in a non-limiting example, comprise two channel iron members 6 connected by an iron strip 8 at each end, and secured by iron plates 10. Press plate 2 fits between upstanding portions of plates 10 and strip 12. Press plate 2 is, for example, comprised of a plate 14 to which a section of high stress form round steel 16 is welded. The stress form round steel is flame hardened. A section is removed from part 16 to form notch 17 into which the end of piston 18 fits, as shown in FIG. 4.

Figure 2:
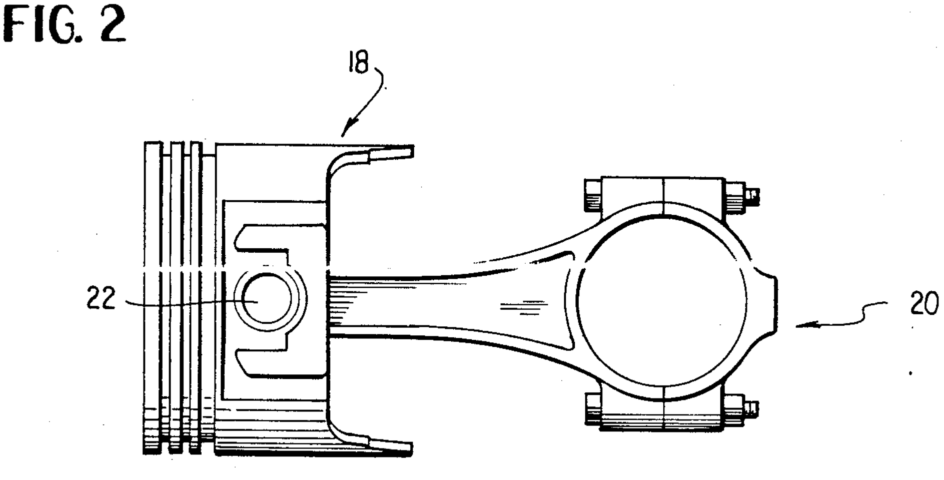
FIG. 2 is a top view of a piston and connecting arm showing a wrist pin in place in the piston.

FIG. 2 shows connecting rod 20 secured in piston 18 by wrist pin 22. Wrist pin 22 is pressed into the eye (not shown) of connecting rod 20 at, for example, a pressure of 300 lb. per sq. in., in a press fit, as known to one skilled in the art, and has a running fit through piston 18. In a non-limiting example, wrist pin 22 has an external diameter of 0.912 in. and is inserted with a press fit into the eye of connecting rod 20 which has an internal diameter of 0.910 in.

In order to remove the wrist pin from the piston assembly (shown in FIG. 2), end section 28 of guide pin 24 (shown in FIG. 3) is inserted into the bore of the lower end of wrist pin 22. Guide pin 24 has a shaft 26, and an end section 28 of reduced diameter. End section 28 has at least one groove 30 encircling the end section, and groove 30 carries O-ring 32 therein to engage the inner bore of wrist pin 22 in a first fit. Preferably two O-rings are used, one in each of two grooves. Three or more O-rings, likewise each engaged in a groove 30, may also be used. End section 28 of guide pin 24 is of sufficient length to provide horizontal and vertical stability to the wrist pin while the wrist pin is being inserted into or removed from the piston assembly. The combined guide pin and wrist pin form a rigid rectilinear structure. Guide pin 34 may be either solid or hollow; a hollow guide pin is preferred as it is lighter in weight, and thus puts less strain on the O-rings. Guide pin shaft 26 and end section 28 may either be formed integrally or in separate parts welded together, or otherwise united, to form guide pin 24, in a manner known to one skilled in the art. A preferred guide pin has a hollow shaft 26 and a solid, grooved end section 28.

To remove the wrist pin, upper end section 28 of guide pin 24 is inserted into the lower end of wrist pin 22 fixed through piston 18 and connecting rod 20, and the lower end of guide pin 24 is inserted through opening 34 in press plate 2 and into cavity 36 in anvil 4 as piston 18 rests on press plate 2. The anvil is positioned on the press (not shown) so that wrist pin 22 and guide pin 24 may fall into a britchen (not shown), fastened to the press.

Figure 5:
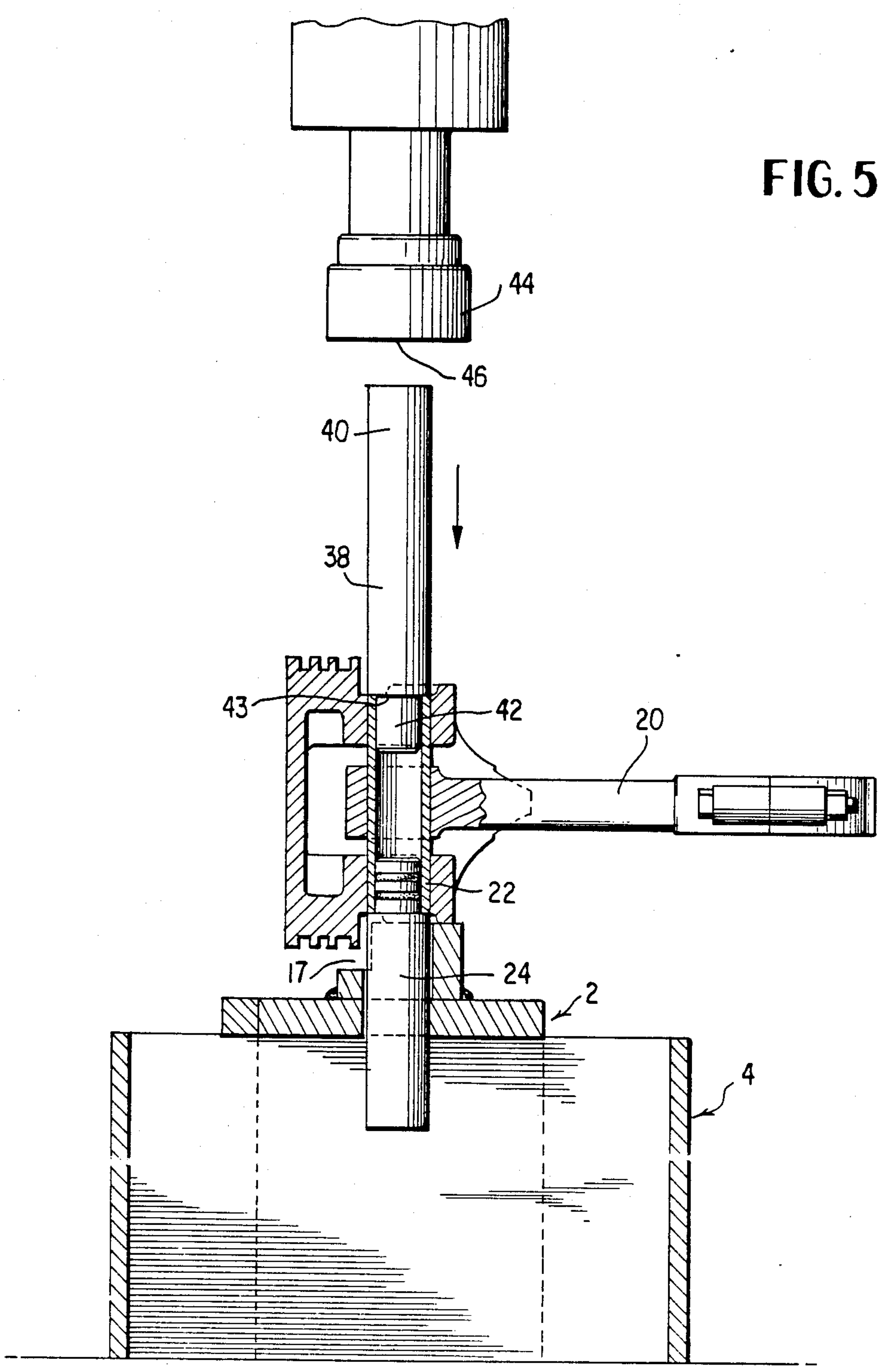
FIG. 5 is a side view, partly in cross-section, of a press pin engaged in the bore of a wrist pin, before insertion of the press pin into the ram.

FIG. 5 shows reduced end section 42 of press pin 38 inserted into the top end of wrist pin 22. Wrist pin 22 is firmly fixed in the piston assembly which is engaged in notch 17 of press plate 2, as described. Press pin 38 has a shaft 40 and an end section 42 of reduced diameter which is inserted into the upper end of the bore of wrist pin 22. End section 42 has a substantially right-angled shoulder 43 and is of smaller external diameter than the internal diameter of the wrist pin, allowing end section 42 to engage easily into the bore of the wrist pin.

Figure 6:
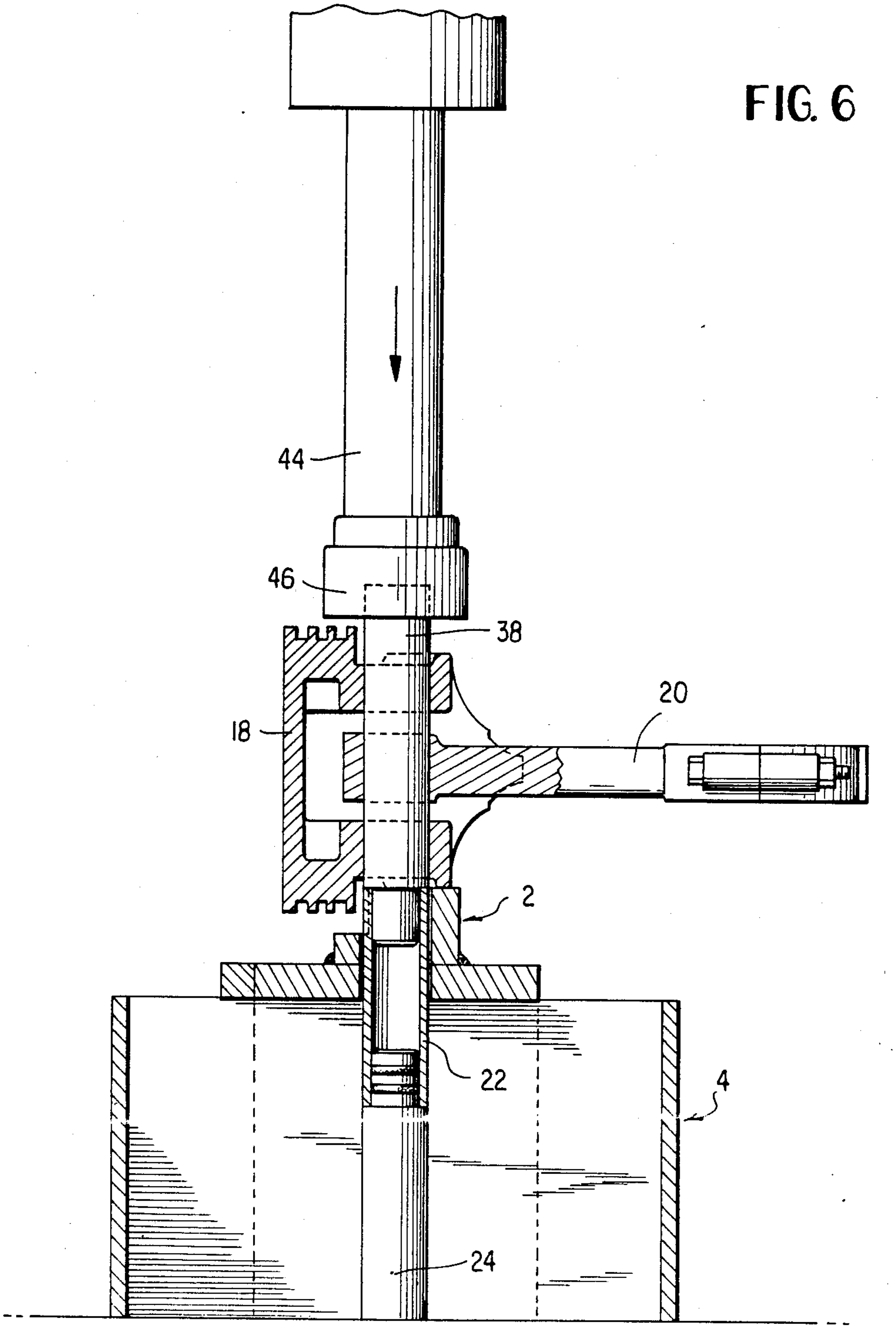
FIG. 6 is a side view, partly in cross-section, of a press pin/wrist pin/guide pin assembly pushed through a piston by a ram.

FIG. 6 shows the action of ram 44 in use to remove a wrist pin from a piston assembly. Press pin 38 has its lower end engaged in the upper end of the bore of wrist pin 22, and the upper end of press pin 38 is then inserted into cavity 46 in the lower end of ram 44. As ram 44 moves downwards, pressure on press pin 38 pushes wrist pin 22 through the shaft of the piston 18, through the eye of connecting rod 20 in which the wrist pin is press fitted, through the opening in press plate 2 and into the cavity in anvil 4. When wrist pin 22 has exited from the shaft of piston 18, connecting rod 20 and piston 18 can be removed, after ram 44 is raised. The wrist pin is recovered from the cavity of the anvil or from a britchen (not shown) attached to the base of the press.

As is shown in FIGS. 5 and 6, press pin 38, wrist pin 22 and guide pin 24 interlock to form a rigid, rectilinear structure, the press pin and guide pin providing horizontal and vertical stability to the wrist pin (which forms the center section of the structure) while inserting the wrist pin into or removing the wrist pin from, the piston assembly. This structure prevents the wrist pin from entering the piston shaft or connecting rod eye at an angle which might damage the piston shaft or connecting rod.

To insert a wrist pin into a piston assembly, the procedure is reversed. The guide pin and wrist pin are assembled together, and the guide pin, which has a smaller outside diameter than the piston bore and the eye of the connecting rod, is inserted into the piston bore, through the eye of the connecting rod, and into the lower end of the wrist pin bore. The piston assembly is then placed on the press plate with the lower end of the guide pin engaged within the ring of the press plate. The lower end of the press pin, having a reduced diameter, is engaged in the upper end of the wrist pin, and the upper end of the press pin is engaged in the lower end of the ram. The ram is actuated and moved downwards forcing the wrist pin linearly into position in a press fit with the connecting rod and in assembled engagement with the piston. In this operation, the guide pin, wrist pin and press pin form a rectilinear, rod-like structure. The guide pin is inserted into the piston/connecting rod assembly before engagement of the press pin with the ram, thus positioning the wrist pin (held between the press pin and the guide pin) in linear, relationship, to enter the bows of the piston shaft and the connecting rod eye coaxially, thus preventing damage to the bore of the piston. After the wrist pin is properly positioned in the piston assembly the press pin and guide pin are removed from each end of the wrist pin.

The press pin, wrist pin and guide pin may be manufactured in several sizes, according to use. A wrist pin may have a bore throughout its length, or may have a bore at each end, the center section being constricted or blocked. Conventionally, a press pin is longer than a guide pin, and this facilitates operation. However, a guide pin may be used instead of a press pin, in most circumstances. The press pin, may be solid throughout, or may have a hollow shaft.

In a typical, non-limiting example, a wrist pin has a bore of 0.605 in. diameter and an outside diameter of 0.912 in. A press pin suitable for use with this wrist pin may have an outer diameter of 0.875 in. and an end portion ground to 0.579 in. for a depth of 0.75 in. from one end to facilitate entry into the wrist pin bore. The press pin may be $5\frac{1}{2}$ in. in length and be an oil hardened steel drill rod. A suitable guide pin has an outside diameter of 0.904 in., and is made of hardened tool steel, $3\frac{7}{8}$ in. in length. Grooves 0.045 to 0.050 in. in depth are formed, centered $\frac{1}{4}$ in. and $\frac{1}{2}$ in. from the outer end portion of reduced diameter. This end portion is, for example, 0.589 in. in diameter. The grooves allow two 1/16 in. O-rings having $\frac{3}{8}$ in. internal diameter and 1/2 in. outside diameter, to be inserted in the grooves to engage the guide pin firmly within the bore of the wrist pin. The end section of a guide pin has a diameter approximately 0.010 in. smaller than the diameter of the bore of the end of a wrist pin into which it is inserted. The outside diameter of the shaft of a guide pin is slightly smaller than the bore of the piston shaft and the connecting rod eye, to permit ready entry of the guide pin into the piston assembly. The outside diameter of the wrist pin is slightly larger than the inside diameter of the connecting rod eye, ensuring a press fit, as is known to one skilled in the art.

The device of the invention eliminates the need to subject the piston to strong clamping pressures while removing or installing a wrist pin, and enables the wrist pin to be fitted in a press fit, without distortion.

While the invention has been described with respect to certain embodiments thereof, it will be appreciated that variations and modifications may be made without departing from the spirit and scope of the invention.

What is claimed is:

1. A method for inserting a wrist pin into an eye of a connecting rod of a piston assembly comprising:

inserting an upper end section of a press pin into a ram for driving the press pin;

inserting a lower end section of reduced diameter of the press pin into a bore in an upper end of a wrist pin;

inserting an upper end section of reduced diameter of a guide pin into a bore in a lower end of the wrist pin;

thereby forming a rigid rectilinear structure of the press pin, wrist pin and guide pin;

driving the rigid rectilinear structure through the eye of a connecting rod of a piston assembly until the wrist pin is positioned through said eye of said connecting rod; and removing the press pin from the upper end of the wrist pin and the guide pin from the lower end of the wrist pin.

2. A method of removing a wrist pin from an eye of a piston assembly comprising:

inserting an upper end section of reduced diameter of a guide pin into a bore in a lower end of a wrist pin held in the eye of the connecting rod in the piston assembly;

inserting a lower end section of reduced diameter of a press pin into a bore in an upper end of the wrist pin;

thereby forming a rigid rectilinear structure of the press pin, wrist pin and guide pin;

inserting an upper end of the press pin into a ram for driving the press pin;

driving the rigid rectilinear structure through the eye of the piston assembly;

whereby the wrist pin is removed from the piston assembly; and removing the press pin from the upper end of the wrist pin and the guide pin from the lower end of the wrist pin.

3. Apparatus for securing a connecting rod into a piston comprising a rigid rectilinear structure formed by interlocking a press pin, a wrist pin and a guide pin, wherein the press pin includes a first end for engaging with a ram and a second end having an end section of reduced diameter for engaging firmly into a bore in a first end of a wrist pin, and the guide pin includes a shaft and an end section of reduced diameter for engaging firmly into a bore in a second end of said wrist pin, wherein said end section of reduced diameter has at least one groove means encircling its perimeter, each of said groove means receiving O-ring means for providing a close fit of said guide pin in said bore of said wrist pin, whereby the rigid rectilinear structure provides horizontal and vertical stability to the wrist pin while inserting said wrist pin into or removing said wrist pin from the piston and the press pin and guide pin are separated from the wrist pin after the wrist pin is installed or removed.

4. A device of claim 3 wherein the press pin further comprises at least one groove means encircling the perimeter of the end section, and O-ring means received in said at least one groove means for providing a close fit of said press pin in the bore of the wrist pin.

5. A device of claim 3 wherein the press pin is solid throughout.

6. A device of claim 3 wherein the guide pin is substantially hollow throughout the length of its shaft and the end section of reduced diameter is of substantially solid construction.

7. A device of claim 3 wherein the guide pin has a bore therethrough.

8. A device of claim 3 wherein the press pin is longer than the guide pin.

9. Apparatus for securing a connecting rod into a piston comprising:

ram means for driving a rigid, rectilinear structure including a press pin, a wrist pin and a guide pin, a wrist pin the press pin having an upper end for engaging into the ram means and a lower end section of reduced diameter for engaging into a bore in an upper end of the wrist pin; and the guide pin having an end section of reduced diameter for engaging into a bore in a lower end of the wrist pin, and at least one groove means encircling said end section of reduced diameter for receiving O-ring means for providing a close fit of said guide pin in the bore of the lower end of the wrist pin;

wherein said wrist pin, press pin and guide pin are interlocked to form the rectilinear structure which is pressed into or out of a piston assembly during installation or removal of a piston wrist pin and said press pin and guide pin are removed from engagement with the wrist pin after said installation or removal of the wrist pin.

10. Apparatus for securing a connecting rod into a piston comprising: a wrist pin a guide pin having a shaft and an end section of reduced diameter for engaging firmly into a bore of a lower end of the wrist pin to form an interlocking, rigid rectilinear structure wherein said end section of reduced diameter has at least one groove means encircling its perimeter, each of said groove means receiving O-ring means for providing a close fit of said guide pin in said bore of said wrist pin, whereby said guide pin is engaged with the wrist pin and the rigid rectilinear structure so formed provides horizontal and vertical stability to the wrist pin while inserting said wrist pin into or removing said wrist pin from the piston.

11. A device of claim 10 wherein the shaft of the guide pin comprises a hollow structure fixed to an end section of reduced diameter having substantially solid construction.

* * * * *